(12) United States Patent
Abedini et al.

(10) Patent No.: US 12,199,709 B2
(45) Date of Patent: Jan. 14, 2025

(54) CONTROL PLANE OF A LAYER-1 MILLIMETER WAVE REPEATER

(71) Applicant: QUALCOMM Incorporated, San Diego, CA (US)

(72) Inventors: Navid Abedini, Somerset, NJ (US); Raju Hormis, New York, NY (US); Junyi Li, Chester, NJ (US); Juergen Cezanne, Ocean Township, NJ (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 16/795,155

(22) Filed: Feb. 19, 2020

(65) Prior Publication Data
US 2020/0280355 A1   Sep. 3, 2020

Related U.S. Application Data

(60) Provisional application No. 62/812,065, filed on Feb. 28, 2019.

(51) Int. Cl.
*H04B 7/06* (2006.01)
*H04W 8/22* (2009.01)
(Continued)

(52) U.S. Cl.
CPC ............ *H04B 7/0617* (2013.01); *H04W 8/22* (2013.01); *H04W 16/28* (2013.01); *H04W 92/045* (2013.01)

(58) Field of Classification Search
CPC ... H04B 7/0617; H04B 7/15542; H04W 8/22; H04W 16/28; H04W 92/045; H04W 84/047
See application file for complete search history.

(56) References Cited

U.S. PATENT DOCUMENTS 10,004,032 B2   6/2018   Islam et al.
10,505,602 B1 *  12/2019   Khan .................. H04B 7/0456
(Continued)

FOREIGN PATENT DOCUMENTS

KR   20150086116 A   7/2015
WO   2016148838   9/2016

OTHER PUBLICATIONS

International Search Report and Written Opinion—PCT/US2020/018988—ISAEPO—Jun. 3, 2020.
(Continued)

*Primary Examiner* — Huy D Vu
*Assistant Examiner* — Robert Ma
(74) *Attorney, Agent, or Firm* — Harrity & Harrity LLP/QUALCOMM Incorporated

(57) ABSTRACT

Various aspects of the present disclosure generally relate to wireless communication. In some aspects, a base station may receive, via a first interface of a repeater, information associated with a second interface of the repeater. The base station may determine a configuration for the second interface of the repeater based at least in part on the information associated with the second interface, and may communicate the configuration for the second interface of the repeater via the first interface. In some aspects, a repeater may transmit, to a base station via a first interface, information associated with a second interface of the repeater. The repeater may receive, via the first interface, a configuration for the second interface, and may configure the second interface based at least in part on the configuration. Numerous other aspects are provided.

56 Claims, 9 Drawing Sheets

(51) Int. Cl.
*H04W 16/28* (2009.01)
*H04W 92/04* (2009.01)

(56) References Cited

U.S. PATENT DOCUMENTS

| | | | |
|---|---|---|---|
| 11,848,741 B2 | 12/2023 | Abedini et al. | |
| 2010/0232345 A1* | 9/2010 | Tsai | H04B 7/15528 370/315 |
| 2013/0272190 A1* | 10/2013 | Du | H04W 28/16 370/315 |
| 2015/0311967 A1* | 10/2015 | Boudreau | H04W 16/28 455/7 |
| 2015/0351135 A1* | 12/2015 | Schmidt | H04W 52/38 455/450 |
| 2017/0230893 A1* | 8/2017 | Miao | H04W 40/22 |
| 2018/0249461 A1* | 8/2018 | Miao | H04W 72/27 |
| 2020/0007202 A1* | 1/2020 | Khan | H04B 7/0473 |
| 2020/0195310 A1 | 6/2020 | Abedini et al. | |
| 2020/0280127 A1 | 9/2020 | Hormis et al. | |
| 2020/0280365 A1 | 9/2020 | Abedini et al. | |
| 2020/0280887 A1 | 9/2020 | Abedini | |
| 2023/0284095 A1 | 9/2023 | Abedini | |
| 2024/0088989 A1 | 3/2024 | Abedini et al. | |

OTHER PUBLICATIONS

Ma P., et al., "A Train Position based Beam Switching Mechanism in High-Speed Railway Scenario", 2017 IEEE 9th International Conference on Communication Software and Networks (ICCSN), IEEE, May 6, 2017 (May 6, 2017), pp. 553-558, XP033285566, DOI: 10.1109/ICCSN.2017.8230173, [retrieved on Dec. 19, 2017], Section III and Figure 7.

Co-pending U.S. Appl. No. 62/848,929, filed May 16, 2019.

* cited by examiner

CONTROL PLANE OF A LAYER-1 MILLIMETER WAVE REPEATER

CROSS-REFERENCE TO RELATED APPLICATION

This patent application claims priority to Provisional Patent Application No. 62/812,065, filed on Feb. 28, 2019, entitled "CONTROL PLANE OF A LAYER-1 MILLIMETER WAVE REPEATER," and assigned to the assignee hereof. The disclosure of the prior application is considered part of and is incorporated by reference in this patent application.

INTRODUCTION

Aspects of the present disclosure generally relate to wireless communication, and more particularly to a millimeter wave repeater.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements may be applicable to other multiple access technologies and the telecommunication standards that employ these technologies.

SUMMARY

In some aspects, a method of wireless communication, performed by a base station, may include receiving, via a first interface of a repeater, information associated with a second interface of the repeater, the second interface being different from the first interface; determining a configuration for the second interface of the repeater based at least in part on the information associated with the second interface; and communicating the configuration for the second interface of the repeater via the first interface of the repeater.

In some aspects, a base station for wireless communication may include memory and one or more processors coupled to the memory. The memory and the one or more processors may be configured to receive, via a first interface of a repeater, information associated with a second interface of the repeater, the second interface being different from the first interface; determine a configuration for the second interface of the repeater based at least in part on the information associated with the second interface; and communicate the configuration for the second interface of the repeater via the first interface of the repeater.

In some aspects, a non-transitory computer-readable medium may store one or more instructions for wireless communication. The one or more instructions, when executed by one or more processors of a base station, may cause the one or more processors to: receive, via a first interface of a repeater, information associated with a second interface of the repeater, the second interface being different from the first interface; determine a configuration for the second interface of the repeater based at least in part on the information associated with the second interface; and communicate the configuration for the second interface of the repeater via the first interface of the repeater.

In some aspects, an apparatus for wireless communication may include means for receiving, via a first interface of a repeater, information associated with a second interface of the repeater, the second interface being different from the first interface; means for determining a configuration for the second interface of the repeater based at least in part on the information associated with the second interface; and means for communicating the configuration for the second interface of the repeater via the first interface of the repeater.

In some aspects, a method of wireless communication, performed by a repeater, may include transmitting, to a base station via a first interface, information associated with a second interface of the repeater, the second interface being different from the first interface; receiving, via the first interface and after transmitting the information associated with the second interface, a configuration for the second interface; and configuring the second interface of the repeater based at least in part on the configuration.

In some aspects, a repeater for wireless communication may include memory and one or more processors coupled to the memory. The memory and the one or more processors may be configured to transmit, to a base station via a first interface, information associated with a second interface of the repeater, the second interface being different from the first interface; receive, via the first interface and after transmitting the information associated with the second interface, a configuration for the second interface; and configure the second interface based at least in part on the configuration.

In some aspects, a non-transitory computer-readable medium may store one or more instructions for wireless communication. The one or more instructions, when executed by one or more processors of a repeater, may cause the one or more processors to: transmit, to a base station via a first interface, information associated with a second interface of the repeater, the second interface being different from the first interface; receive, via the first interface and after transmitting the information associated with the second interface, a configuration for the second interface; and configure the second interface based at least in part on the configuration.

In some aspects, an apparatus for wireless communication may include means for transmitting, to a base station via a first interface, information associated with a second interface of the repeater, the second interface being different from the first interface; means for receiving, via the first interface and after transmitting the information associated with the second interface, a configuration for the second interface; and means for configuring the second interface based at least in part on the configuration.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
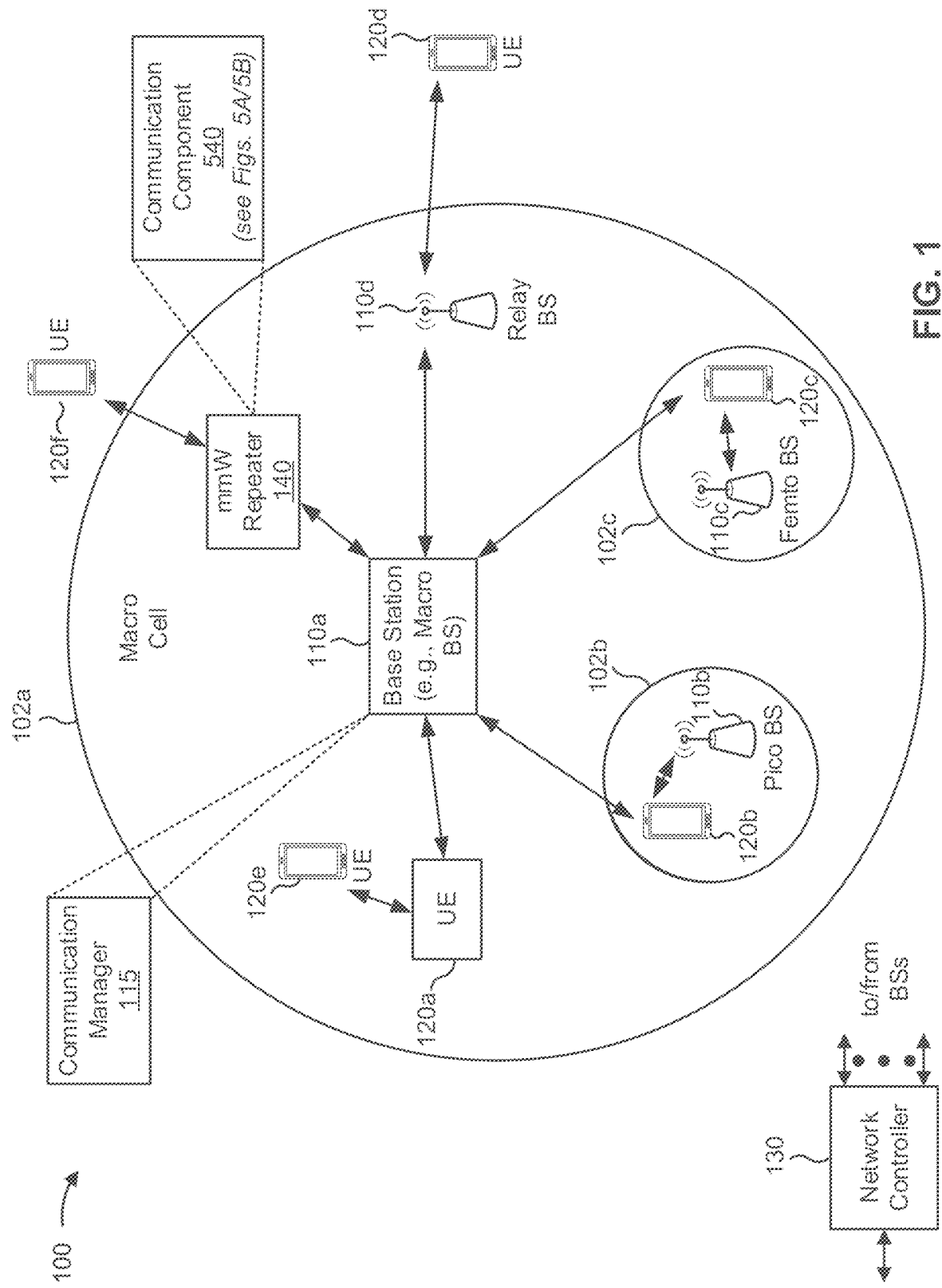
FIG. 1 is a block diagram conceptually illustrating an example of a wireless communication network, in accordance with various aspects of the present disclosure.

As described herein, a layer-1 millimeter wave (mmW) repeater may include components that enable receiving a signal on a receive antenna associated with a high frequency (HF) interface (e.g., a mmW interface), amplifying the power of the signal using a gain component, and transmitting the amplified signal on a transmit antenna associated with the HF interface. These operations may be orchestrated and/or controlled by a controller of the mmW repeater. In some aspects, the mmW repeater may include a communication component that enables communication via a low frequency (LF) interface (e.g., an interface that uses a sub-6 gigahertz (GHz) frequency) for transmission or reception of information associated with such control signals (e.g., to or from one or more base stations).

However, particular capabilities, configurations, and/or architectures of HF interfaces may vary among mmW repeaters. Hence, a configuration for an HF interface of a given mmW repeater may take into account a capability, a configuration, and an architecture of an HF interface of the given mmW repeater. Some aspects described herein provide techniques and apparatuses for a control plane design of a mmW repeater. In some aspects, a repeater may transmit, to a base station via an LF interface, information associated with an HF interface of the repeater. In some aspects, the base station may receive, via the LF interface, the information associated with the HF interface, may determine a configuration for the HF interface based at least in part on the information associated with the HF interface, and may communicate the configuration for the HF interface via the LF interface. In some aspects, the repeater may receive, via the LF interface, the configuration for the HF interface, and may configure the HF interface based at least in part on the configuration.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e, 120f, and/or the like) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, millimeter wave (mmW) repeater 140 (sometimes referred to herein as a repeater 140) may receive an analog millimeter wave signal from a base station 110, may amplify the analog millimeter wave signal, and may transmit the amplified millimeter wave signal to one or more UEs 120 (e.g., shown as UE 120f). In some aspects, the mmW repeater 140 may be an analog mmW repeater, sometimes also referred to as a layer-1 mmW repeater. Additionally, or alternatively, the repeater mmW 140 may be a wireless transmit receive point (TRP) acting as a distributed unit (e.g., of a 5G access node) that communicates wirelessly with a base station 110 acting as a central unit or an access node controller (e.g., of the 5G access node). The mmW repeater may receive, amplify, and transmit the analog mmW signal without performing analog-to-digital conversion of the analog mmW signal and/or without performing any digital signal processing on the mmW signal. In this way, latency may be reduced and a cost to produce the mmW repeater 140 may be reduced. Additional details regarding mmW repeater 140 are provided elsewhere herein.

As shown in FIG. 1, the base station 110 may include a communication manager 115. As described in more detail elsewhere herein, the communication manager 115 may receive, via a first interface of mmW repeater 140, information associated with a second interface of mmW repeater 140, the second interface being different from the first interface; determine a configuration for the second interface of mmW repeater 140 based at least in part on the information associated with the HF interface; and communicate the configuration for the second interface of mmW repeater 140 via the first interface of mmW repeater 140. Additionally, or alternatively, the communication manager 115 may perform one or more other operations described herein.

As indicated above, FIG. 1 is provided merely as an example. Other examples may differ from what is described with regard to FIG. 1.

Figure 2:
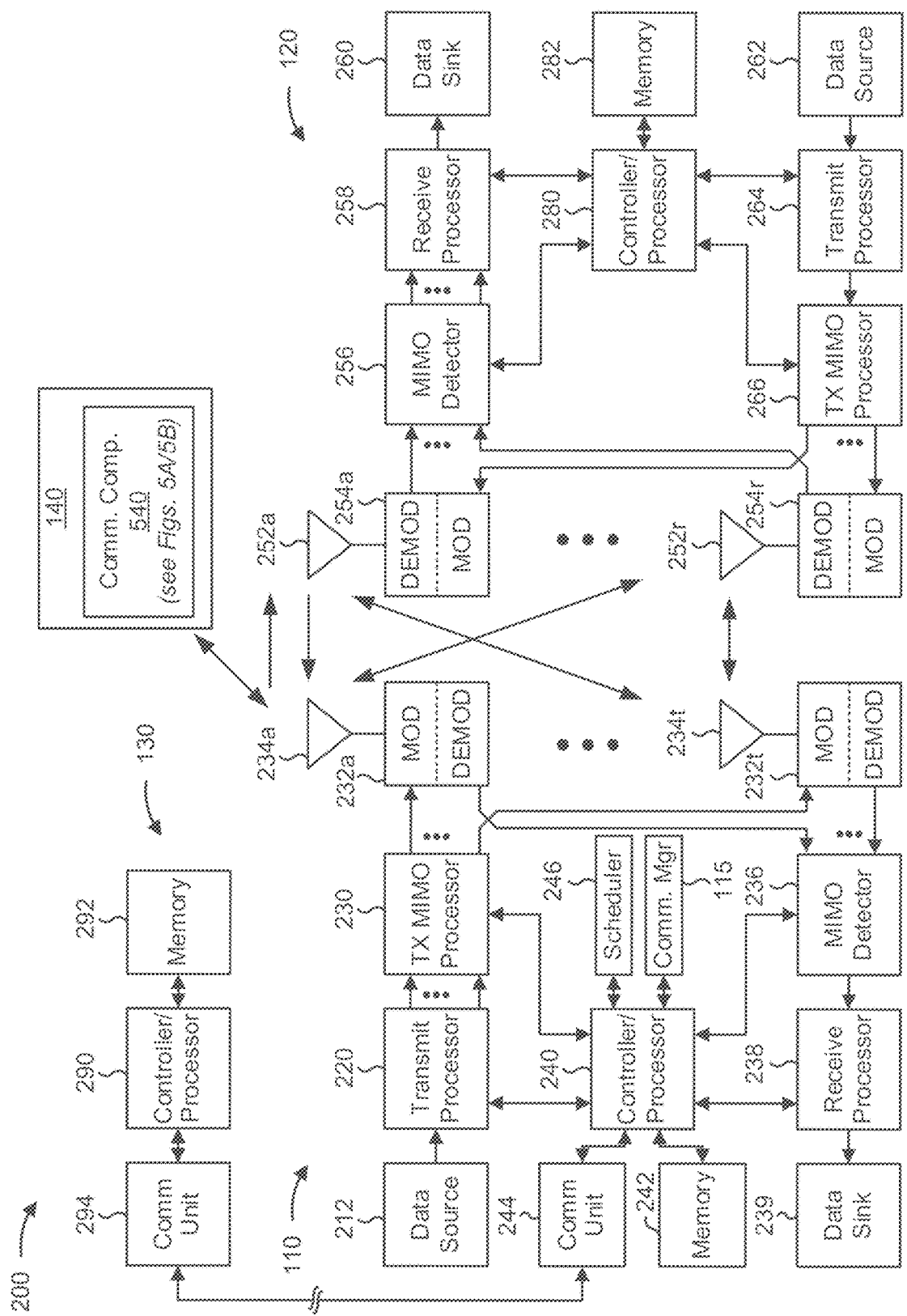
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may respectively be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110 and/or any other component(s) of FIG. 2 may perform one or more techniques associated with a control plane for a mmW repeater, as described in more detail elsewhere herein. For example, controller/processor 240 of base station 110 and/or any other component(s) of FIG. 2 may perform or direct operations of, for example, process 700 of FIG. 7, process 800 of FIG. 8, and/or other processes as described herein. Memories 242 may store data and program codes for base station 110, respectively. A scheduler 246 may schedule UEs for data transmission on the downlink and/or uplink.

In some aspects, the base station 110 may include means for receiving, via a first interface of mmW repeater 140, information associated with a second interface of mmW repeater 140, the second interface being different from the first interface; means for determining a configuration for the second interface of mmW repeater 140 based at least in part on the information associated with the second interface; means for communicating the configuration for the second interface of mmW repeater 140 via the first interface of mmW repeater 140; and/or the like. Additionally, or alternatively, the base station 110 may include means for performing one or more other operations described herein. In some aspects, such means may include the communication manager 115. In some aspects, such means may include one or more components of the base station 110 described in connection with FIG. 2.

As indicated above, FIG. 2 is provided merely as an example. Other examples may differ from what is described with regard to FIG. 2.

Figure 3:
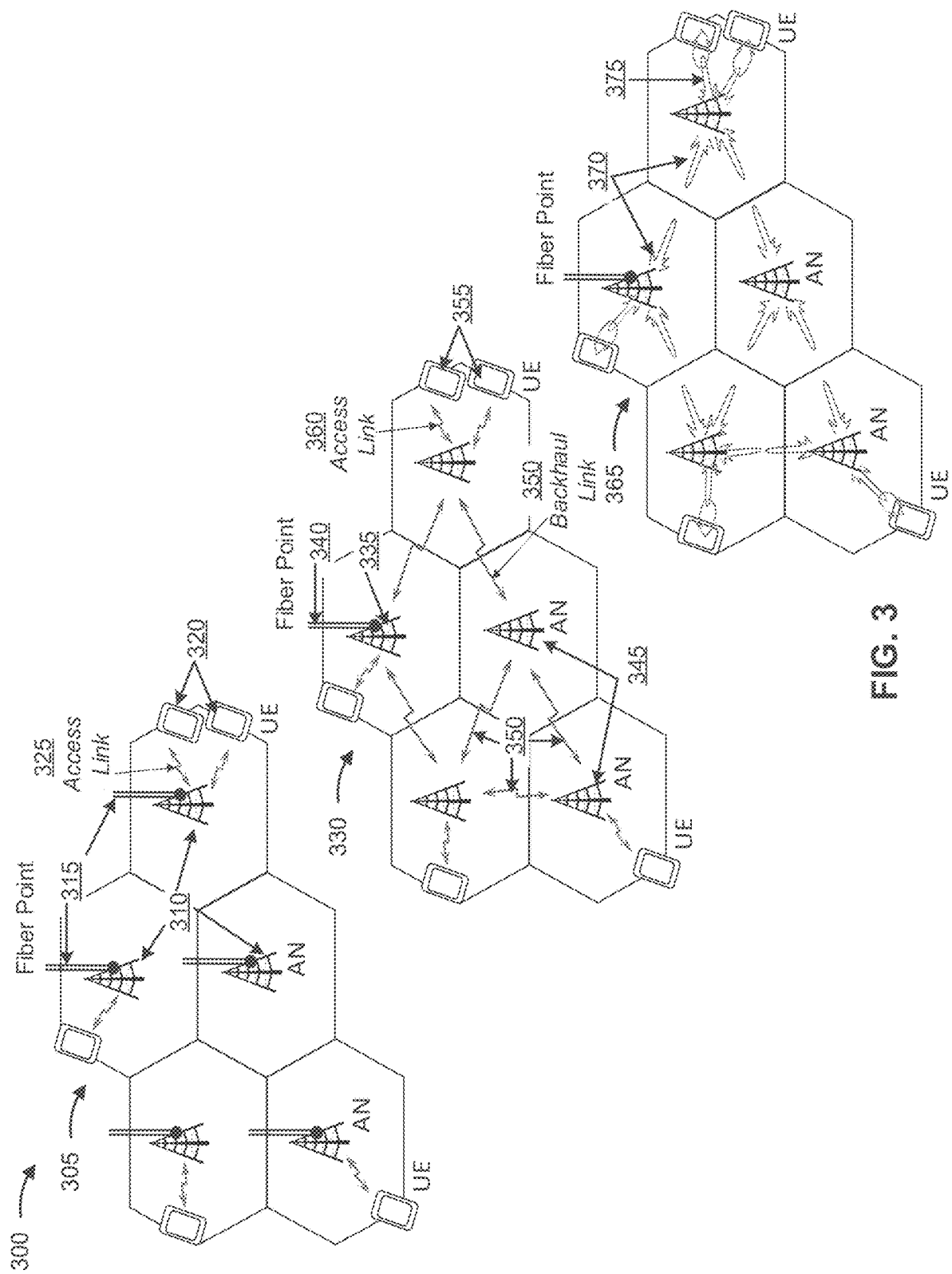
FIG. 3 is a diagram illustrating examples of radio access networks, in accordance with various aspects of the present disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly with or indirectly with (e.g., via one or more non-anchor base stations 345) the anchor base station 335 via one or more backhaul links 350 to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

In some aspects, an IAB network may support a multi-hop wireless backhaul. Additionally, or alternatively, nodes of an IAB network may use the same radio access technology (e.g., 5G/NR). Additionally, or alternatively, nodes of an IAB network may share resources for access links and backhaul links, such as time resources, frequency resources, spatial resources, and/or the like. Furthermore, various architectures of IAB nodes and/or IAB donors may be supported.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
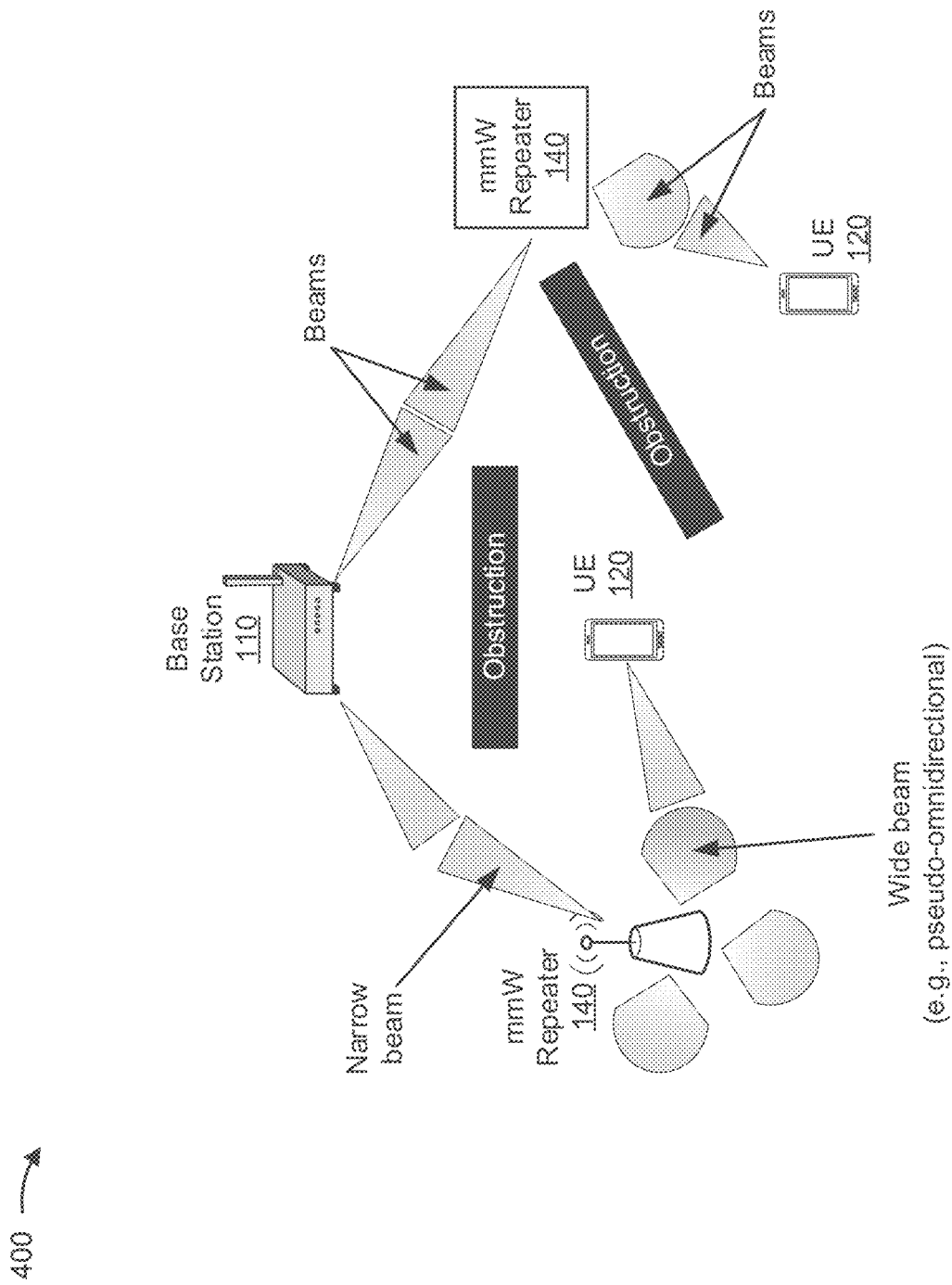
FIG. 4 is a diagram illustrating an example of communicating using a millimeter wave repeater, in accordance with various aspects of the present disclosure.

FIG. 4 is a diagram illustrating an example 400 of communicating using an analog millimeter wave repeater, in accordance with various aspects of the present disclosure.

Because millimeter wave communications have a higher frequency and shorter wavelength than other types of radio waves used for communications (e.g., sub-6 GHz communications), millimeter wave communications may have shorter propagation distances and may be more easily blocked by obstructions than other types of radio waves. For example, a wireless communication that uses sub-6 GHz radio waves may be capable of penetrating a wall of a building or a structure to provide coverage to an area on an opposite side of the wall from a base station 110 that communicates using the sub-6 GHz radio waves. However, a millimeter wave may not be capable of penetrating the same wall (e.g., depending on a thickness of the wall, a material from which the wall is constructed, and/or the like). Some techniques and apparatuses described herein use a millimeter wave repeater 140 to increase the coverage area of a base station 110, to extend coverage to UEs 120 without line of sight to the base station 110 (e.g., due to an obstruction), and/or the like. Furthermore, the millimeter wave repeater 140 described herein may be a layer 1 or an analog millimeter wave repeater, which is associated with a lower cost, less processing, and lower latency than a layer 2 or layer 3 repeater.

As shown in FIG. 4, a millimeter wave repeater 140 may perform directional communication by using beamforming to communicate with a base station 110 via a first beam (e.g., a backhaul beam over a backhaul link with the base station 110) and to communicate with a UE 120 via a second beam (e.g., an access beam over an access link with the UE 120). To achieve long propagation distances and/or to satisfy a required link budget, the millimeter wave repeater may use narrow beams (e.g., with a beam width less than a threshold) for such communications.

However, using a narrower beam requires the use of more resources of the millimeter wave repeater 140 (e.g., processing resources, memory resources, power, battery power, and/or the like) and more network resources (e.g., time resources, frequency resources, spatial resources, and/or the like), as compared to a wider beam, to perform beam training (e.g., to determine a suitable beam), beam maintenance (e.g., to find suitable beam as conditions change due to mobility and/or the like), beam management, and/or the like. This may waste resources of the millimeter wave repeater 140 and/or network resources as compared to using a wider beam, and may lead to increased cost of production of millimeter wave repeaters 140, which may be deployed extensively throughout a radio access network.

For example, a millimeter wave repeater 140 may be deployed in a fixed location with limited or no mobility, similar to a base station 110. As shown in FIG. 4, the millimeter wave repeater 140 may use a narrower beam to communicate with the base station 110 without unnecessarily consuming network resources and/or resources of the millimeter wave repeater 140 because the need for beam training, beam maintenance, and/or beam management may be limited, due to limited or no mobility of the base station 110 and the millimeter wave repeater 140 (and/or due to a line of sight communication path between the base station 110 and the millimeter wave repeater 140).

As further shown in FIG. 4, the millimeter wave repeater 140 may use a wider beam (e.g., a pseudo-omnidirectional beam and/or the like) to communicate with one or more UEs 120. This wider beam may provide wider coverage for access links, thereby providing coverage to mobile UEs 120 without requiring frequent beam training, beam maintenance, and/or beam management. In this way, network resources and/or resources of the millimeter wave repeater 140 may be conserved. Furthermore, if the millimeter wave repeater 140 does not include digital signal processing capabilities, resources of the base station 110 (e.g., processing resources, memory resources, and/or the like) may be conserved that would otherwise be used to perform such signal processing for the millimeter wave repeater 140, and network resources may be conserved that would otherwise be used to communicate input to or output of such processing between the base station 110 and the millimeter wave repeater 140.

In this way, the millimeter wave repeater 140 may increase a coverage area, provide access around obstructions (as shown), and/or the like, while conserving resources of the base station 110, resources of the millimeter wave repeater 140, network resources, and/or the like. Additional details are described below.

As indicated above, FIG. 4 is provided as an example. Other examples may differ from what is described with regard to FIG. 4.

Figure 5A:
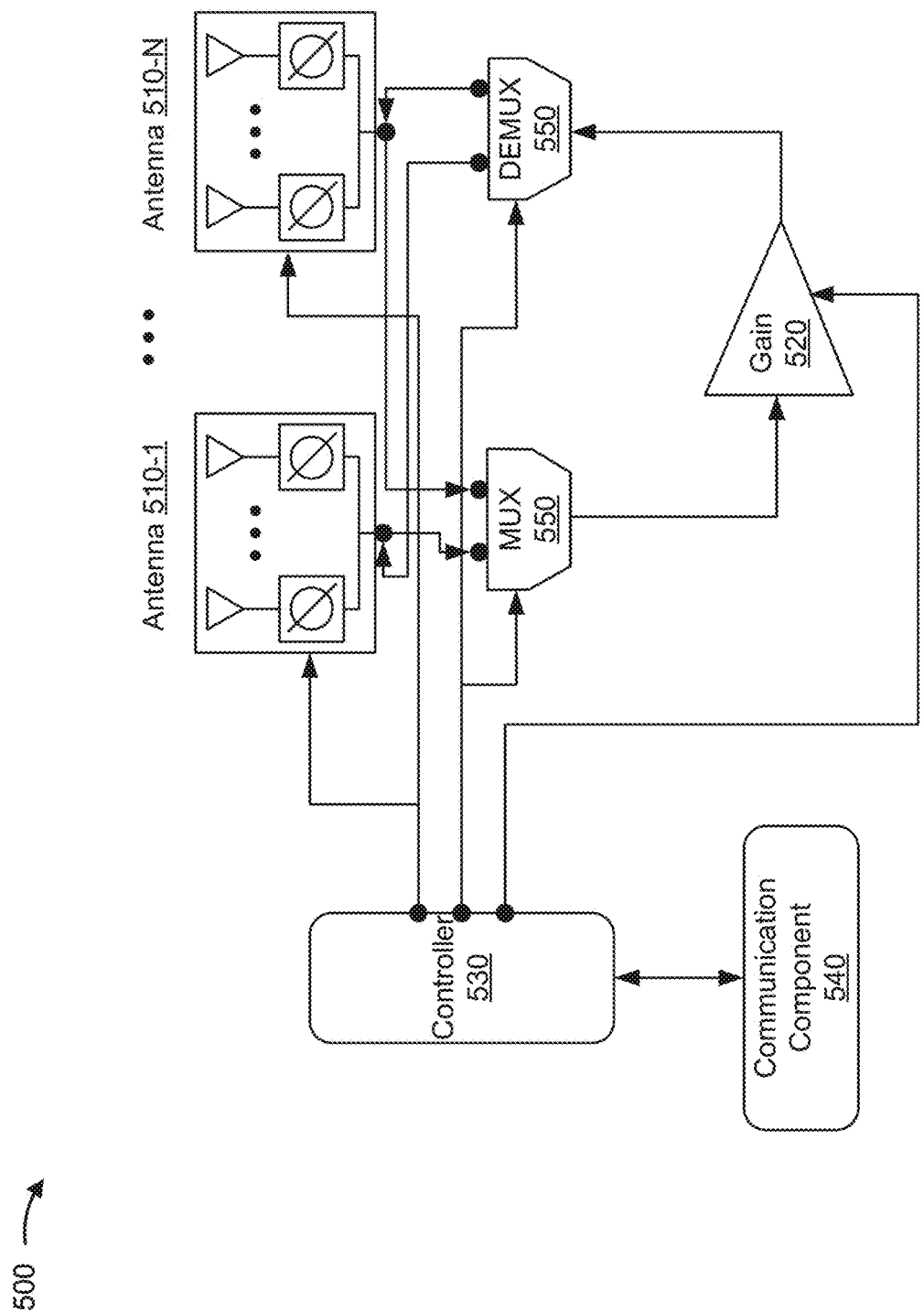
FIGS. 5A and 5B are diagrams illustrating example millimeter wave repeaters, in accordance with various aspects of the present disclosure.
Figure 5B:
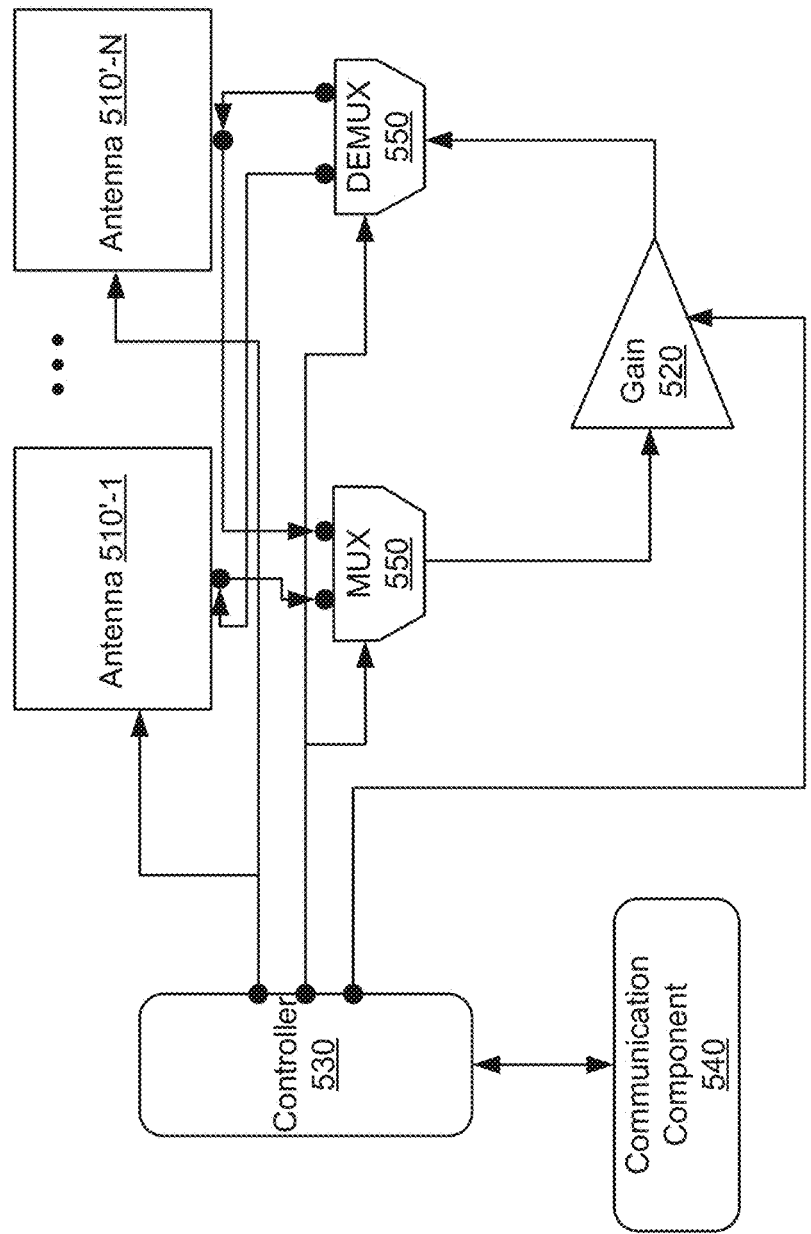

FIGS. 5A and 5B are diagrams illustrating examples of a millimeter wave repeater 500, in accordance with various aspects of the present disclosure. In some aspects, millimeter wave repeater 500 may correspond to millimeter wave repeater 140 shown in FIG. 1.

As shown in FIG. 5A, in some aspects, the millimeter wave repeater 500 may include one or more phased array antennas 510-1 through 510-N (N>1), a gain component 520, a controller 530, a communication component 540, and a multiplexer (MUX) and/or demultiplexer (DEMUX) (MUX/DEMUX) 550.

As shown in FIG. 5B, in some aspects, the millimeter wave repeater 500 may include one or more metamaterial antennas 510'-1 through 510'-N, gain component 520, controller 530, communication component 540, and one or more MUX/DEMUX 550.

An antenna 510/510' includes one or more antenna elements capable of being configured for beamforming. In some aspects, as illustrated in FIG. 5A, millimeter wave repeater 500 may include one or more phased array antennas 510, which may be referred to as a phased array because phase values and/or phase offsets of the antenna elements may be configured to form a beam, with different phase values and/or phase offsets being used for different beams (e.g., in different directions).

In some aspects, as illustrated in FIG. 5B, millimeter wave repeater 500 may include one or more metamaterial antennas 510'. In some aspects, a metamaterial antenna may comprise a synthetic material with negative permittivity and/or permeability, which yields a negative refractive index. Due to the resulting superior antenna gain and electro-magnetic lensing, the metamaterial antenna may not need to be used in a phased-array configuration. However, if in phased-array configuration, antenna spacing could be less than a typically used spacing of lambda/2, where lambda refers to a wavelength of the RF carrier signal. In some aspects, due to superior beamforming, the metamaterial antenna may reduce leakage back to the receive (RX) antenna and may reduce a chance of instability in the RF chain. Hence, the use of metamaterial antennas may reduce or obviate a need for a feedback path.

In some aspects, an antenna 510/510' may be a fixed RX antenna capable of only receiving communications, and not transmitting communications. In some aspects, an antenna 510/510' may be a fixed transmit (TX) antenna capable of only transmitting communications, and not receiving communications. In some aspects, an antenna 510/510' may be capable of being configured to act as an RX antenna or a TX antenna (e.g., via a TX/RX switch, a MUX/DEMUX, and/or the like). The antennas 510/510' may be capable of communicating using millimeter waves.

Gain component 520 includes a component capable of amplifying an input signal and outputting an amplified signal. For example, gain component 520 may include a power amplifier, a variable gain component, and/or the like. In some aspects, gain component 520 may have variable gain control. The gain component 520 may connect to an RX antenna (e.g., a first antenna 510/510'-1) and a TX antenna (e.g., a second antenna 510/510'-2) such that an analog millimeter wave signal, received via the RX antenna, can be amplified by the gain component 520 and output to the TX antenna for transmission. In some aspects, the level of amplification of the gain component 520 may be controlled by the controller 530.

Controller 530 includes a component capable of controlling one or more other components of the millimeter wave repeater 500. For example, the controller 530 may include a controller, a microcontroller, a processor, and/or the like. In some aspects, the controller 530 may control the gain component 520 by controlling a level of amplification or gain applied by the gain component 520 to an input signal. Additionally, or alternatively, the controller 530 may control an antenna 510/510' by controlling a beamforming configuration for the antenna 510/510' (e.g., one or more phase values for the antenna 510/510', one or more phase offsets for the antenna 510/510', one or more power parameters for the antenna 510/510', one or more beamforming parameters for the antenna 510/510', a TX beamforming configuration, an RX beamforming configuration, and/or the like), by controlling whether the antenna 510/510' acts as an RX antenna or a TX antenna (e.g., by configuring interaction and/or connections between the antenna 510/510' and a MUX/DEMUX 550), and/or the like. Additionally, or alternatively, the controller 530 may power on or power off one or more components of millimeter wave repeater 500 (e.g., when a base station 110 does not need to use the millimeter wave repeater to serve UEs 120). In some aspects, the controller 530 may control a timing of one or more of the above configurations.

Communication component 540 may include a component capable of wirelessly communicating with a base station 110 using a wireless technology other than millimeter wave. For example, the communication component 540 may communicate with the base station 110 using a personal area network (PAN) technology (e.g., Bluetooth, Bluetooth Low Energy (BLE), and/or the like), a 4G or LTE radio access technology, a narrowband Internet of Things (NB-IoT) technology, a visible light communication technology, and/or the like. In general, the communication component 540 enables communication (e.g., with base station 110) via a low frequency (LF) interface (e.g., an interface that uses a sub-6 GHz frequency). In some aspects, the communication component 540 may use a low frequency communication technology, and an antenna 510/510' may use a higher frequency (HF) communication technology (e.g., millimeter wave and/or the like). In some aspects, an antenna 510/510' may be used to transfer data between the millimeter wave repeater 500 and the base station 110, and the communication component 540 may be used to transfer control information between the millimeter wave repeater 500 and the base station 110 (e.g., a report, a configuration, instructions to power on or power off one or more components, and/or the like).

MUX/DEMUX 550 may be used to multiplex and/or demultiplex communications received from and/or transmitted to an antenna 510/510'. For example, MUX/DEMUX 550 may be used to switch an RX antenna to a TX antenna.

In some aspects, the millimeter wave repeater 500 does not include any components for digital signal processing. For example, the millimeter wave repeater 500 may not include a digital signal processor, a baseband processor, a digital-to-analog converter (DAC), an analog-to-digital converter (ADC), and/or the like. In this way, a cost to produce the millimeter wave repeater 500 may be reduced. Furthermore, latency may be reduced by eliminating digital processing of received millimeter wave signals prior to transmission of corresponding amplified millimeter wave signals.

In some aspects, one or more antennas 510/510', gain component 520, controller 530, communication component 540, MUX/DEMUX 550, and/or the like may perform one or more operations associated with a control plane of the millimeter wave repeater 500, as described in more detail elsewhere herein. For example, one or more components of millimeter wave repeater 500 may perform or direct operations of, for example, process 700 of FIG. 7, process 800 of FIG. 8, and/or other processes as described herein.

In some aspects, millimeter wave repeater 500 may include means for transmitting, to base station 110 via a first interface of millimeter wave repeater 500 information associated with a second interface of millimeter wave repeater 500, the second interface being different from the first interface; means for receiving, via the first interface and after transmitting the information associated with the second interface, a configuration for the second interface of millimeter wave repeater 500; means for configuring the second interface of millimeter wave repeater 500 based at least in part on the configuration; and/or the like. In some aspects, such means may include one or more components of millimeter wave repeater 500 described in connection with FIGS. 5A and 5B.

As indicated above, FIGS. 5A and 5B are provided as an example. Other examples may differ from what is described with regard to FIGS. 5A and 5B. For example, millimeter wave repeater 500 may include additional components, fewer components, different components, or differently arranged components than those shown in FIGS. 5A and 5B. Furthermore, two or more components shown in FIGS. 5A and 5B may be implemented within a single component, or a single component shown in FIGS. 5A and 5B may be implemented as multiple components. Additionally, or alternatively, a set of components (e.g., one or more components) of millimeter wave repeater 500 may perform one or more functions described as being performed by another set of components of millimeter wave repeater 500.

As described above, a mmW repeater 140 may include components that enable receiving a signal on a RX antenna (e.g., antenna 510/510'-1) associated with a high frequency (HF) interface (e.g., a mmW interface), amplifying the power of the signal using gain component 520, and transmitting the amplified signal on TX antenna (e.g., antenna 510/510'-2) associated with the HF interface. These operations may be orchestrated and/or controlled by controller 530. In some aspects, mmW repeater 140 may include communication component 540 that enables communication via an LF interface (e.g., an interface that uses a sub-6 GHz frequency) for transmission or reception of information associated with such control signals (e.g., to or from one or more base stations 110).

However, particular capabilities, configurations, and/or architectures of HF interfaces may vary among mmW repeaters 140. Hence, a configuration for an HF interface of a given mmW repeater 140 may take into account a capability, a configuration, and an architecture of an HF interface of the given mmW repeater 140. Some aspects described herein provide techniques and apparatuses for a control plane design of a mmW repeater 140.

Figure 6:
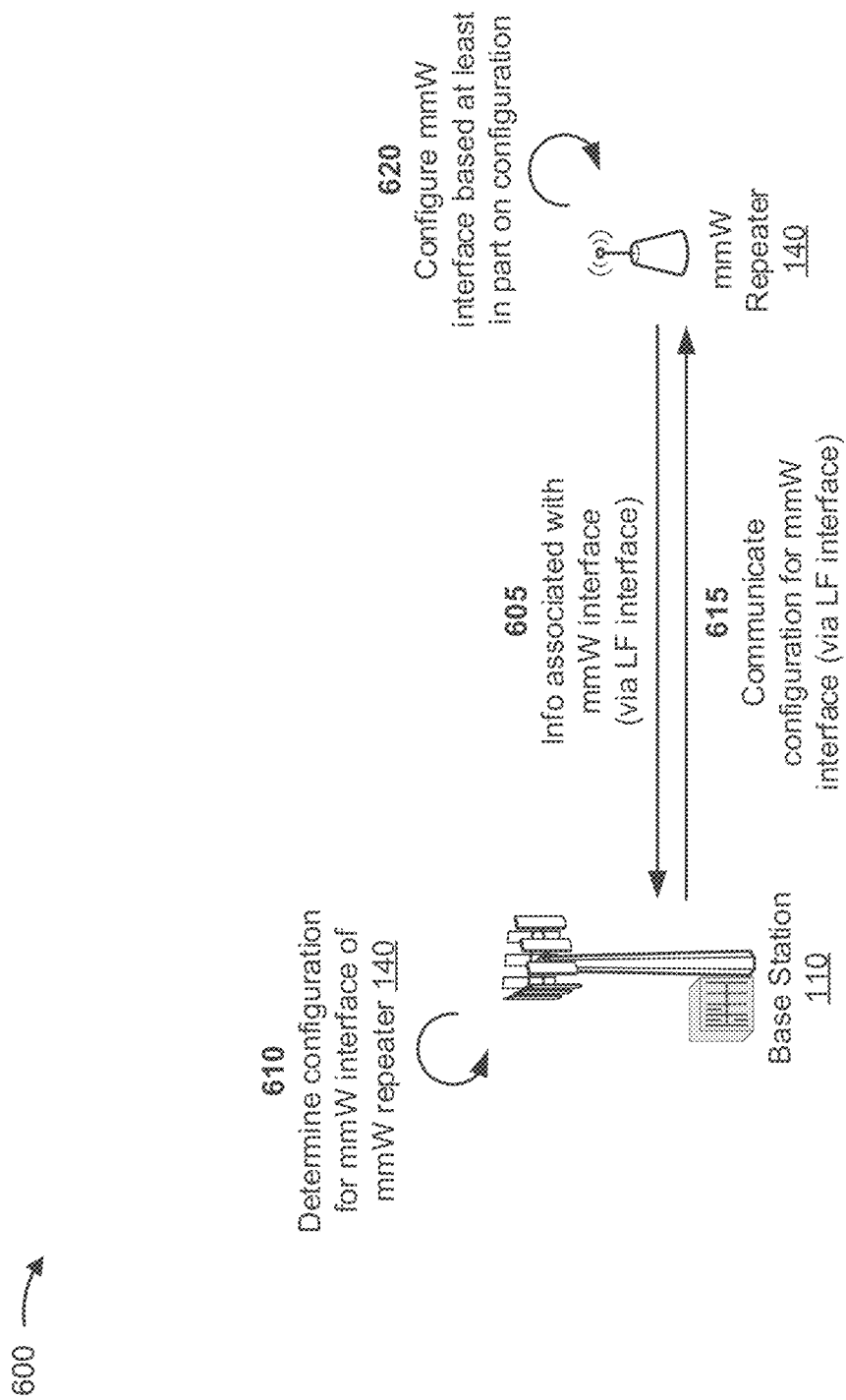
FIG. 6 is a diagram illustrating an example associated with a control plane of a millimeter wave repeater, in accordance with various aspects of the present disclosure.

FIG. 6 is a diagram illustrating an example 600 associated with a control plane of mmW repeater 140, in accordance with various aspects of the present disclosure.

As shown in FIG. 6, and by reference number 605, mmW repeater 140 may transmit information associated with an HF interface (e.g., a mmW interface) of mmW repeater 140. In some aspects, mmW repeater 140 may transmit the information associated with the HF interface via an LF interface of mmW repeater 140.

In some aspects, mmW repeater 140 may transmit the information associated with the HF interface based at least in part on a request transmitted by base station 110. For example, base station 110 may transmit, to mmW repeater 140 and via an LF interface of base station 110, a request for the information associated with the HF interface of mmW repeater 140. Here, mmW repeater 140 may receive the request via the LF interface of mmW repeater 140, and may transmit the information associated with the HF interface based at least in part on receiving the request.

In some aspects, mmW repeater 140 may transmit the information associated with the HF interface after a connection between mmW repeater 140 and base station 110. For example, mmW repeater 140 and base station 110 may establish a connection via their respective LF interfaces, and mmW repeater 140 may transmit the information associated with the HF interface via the LF interface of the mmW repeater 140 after the connection is established.

In some aspects, the information associated with the HF interface includes information associated with a capability associated with the HF interface of mmW repeater 140, a configuration of the HF interface of mmW repeater 140, and/or an architecture of the HF interface of mmW repeater 140.

For example, in some aspects, the information associated with the HF interface of mmW repeater 140 includes information that identifies one or more components of the HF interface and capability information associated with the one or more components of the HF interface.

As a particular example, the information associated with the HF interface of mmW repeater 140 may include information associated with antennas 510/510' and their associated configurations. For example, when antenna 510/510' includes a phased array, the information associated with the HF interface may include information that identifies a number of antenna elements in each antenna, a type of a given antenna, a polarization of a given antenna, an arrangement of the antennas, relative locations of the antennas, a beam correspondence capability of a given antenna, and/or the like. As another particular example, when antenna 510/510' includes a metamaterial antenna, the information associated with the HF interface may include information that identifies a beam steering latency associated with the antenna, a frequency range associated with the antenna, a bandwidth associated with the antenna, whether the antenna is capable of creating multiple simultaneous beams (e.g., a composite beam), and/or the like. As another particular example, the information associated with the HF interface of mmW repeater 140 may include information associated with an amplifier of mmW repeater 140 (e.g., a low noise amplifier, a power amplifier, and/or the like), such as a type of the amplifier, an amplification capability of the amplifier, a location of the amplifier, and/or the like. As another particular example, the information associated with the HF interface of mmW repeater 140 may include information associated with a TX/RX switch of mmW repeater 140, such as a number of TX/RX switches, a switching speed of a given TX/RX switch, a location of a given TX/RX switch, and/or the like. As another particular example, the information associated with the HF interface of mmW repeater 140 may include information associated with a power detector of mmW repeater 140 (e.g., whether mmW repeater 140 can measure received power on a given antenna 510/510'). As another particular example, the information associated with the HF interface of mmW repeater 140 may include information associated with a signal generator of mmW repeater 140 (e.g., whether mmW repeater 140 can generate an HF signal for transmission on the HF interface).

As another example, the information associated with the HF interface of mmW repeater 140 may include information that describes interconnection of two or more components of the HF interface of mmW repeater 140. For example, the information associated with the HF interface may include information that describes connections between antennas 510/510' of mmW repeater 140, information that identifies a number of TX/RX chains of mmW repeater 140, and/or the like.

As another example, the information associated with the HF interface of mmW repeater 140 may include information that describes a beamforming configuration associated with the HF interface of mmW repeater 140. In some aspects, the information that describes the beamforming configuration may include, for example, information associated with a TX/RX beamforming codebook (e.g., a number of beams, beam widths, a number of layers, and/or the like), a spatial quasi co-location (QCL) indication, and/or the like.

As further shown in FIG. 6, base station 110 may receive the information associated with the HF interface and, as shown by reference number 610, may determine a configuration for the HF interface of mmW repeater 140 based at least in part on the information associated with the HF interface.

In some aspects, the configuration includes information associated with a configuration of the HF interface of mmW repeater 140. For example, the configuration may include information associated with powering on one or more components of the HF of the repeater (e.g., an indication that the one or more components are to be powered off) or information associated with powering off one or more components of the second interface of the repeater (e.g., an indication that the one or more components are to be powered on). As another example, the configuration may include information associated with setting a gain of a power amplifier. As another example, the configuration may include information associated with a TX beam beamforming configuration and/or information associated with an RX beam beamforming configuration. As another example, the configuration may include information associated with measuring receive power on a given antenna 510/510'. As another example, the configuration may include information associated with generating or transmitting a signal using the HF interface. As another example, the configuration may include information associated with performing beam sweeping (e.g., an indication of whether mmW repeater 140 is to perform beam sweeping). As another example, the configuration may include information associated with a set of time-domain resources on which to apply the configuration (e.g., information that identifies a set of time-domain resources for which a given configuration is to be applied).

As further shown in FIG. 6, and by reference number 615, base station 110 may communicate the configuration for the HF interface of mmW repeater 140 to mmW repeater 140. In some aspects, base station 110 may communicate the configuration via the LF interface of mmW repeater 140. In some aspects, base station may communicate the configuration in a control command.

In some aspects, base station 110 may communicate one or more items of information associated with the configuration in a set of control fields of the control command. The set of control fields may include, for example, a timing configuration field, a beamforming configuration field, a power configuration field, an operating mode field (e.g., indicating whether a given antenna 510/510' is to be used for transmission or reception; indicating whether the given antenna 510/510' is to be powered on, powered off, or remain in a current state; and/or the like).

In some aspects, the configuration indicates an active setting associated with the HF interface of mmW repeater 140. The active setting may be associated with, for example, configuring mmW repeater 140 to adopt a set of parameters, included in a set of control command fields, according to a timing configuration include in the control command. In some aspects, active settings can be used in order to support a dynamic setting, a semi-persistent setting, and/or a periodic setting associated with the configuration of the HF interface of mmW repeater 140. In some aspects, the active setting may indicate that mmW repeater 140 is to to adopt a beamforming configuration or a power setting for an upcoming communication. In some aspects, a control command may explicitly carry values of relevant parameters (e.g., a beam forming configuration, a power setting, and/or the like). Alternatively, in some aspects, the control command may indicate (e.g., by providing an index) a value that has been preconfigured using a passive setting.

In some aspects, the configuration indicates a passive setting associated with the HF interface of mmW repeater 140. The passive setting may be associated with, for example, providing mmW repeater 140 with information to preconfigure a table to be stored on mmW repeater 140. As another example, the passive setting may be a setting associated with a beamforming configuration that can be activated at a later time (e.g., using a control command). In some aspects, passive settings can be used in accordance with activation commands by, for example, providing mmW repeater 140 with control command that includes a row index to the preconfigured table (e.g., when the row of the preconfigured table includes information that identifies one or more configuration parameters for the HF interface of mmW repeater 140). In general, a passive setting may include one or more sets of configurations capable of being activated at a later time (e.g., by providing a control command, associated with the passive setting, to the UE at a later time).

In some aspects, the configuration may be used to semi-statically configure a first parameter associated with the HF interface and to dynamically configure a second parameter associated with the HF interface. In other words, in some aspects, the configuration may cause various parameters, associated with the HF interface of mmW repeater 140, to be configured at different time scales. For example, an on-off period associated with a given antenna 510/510' may be semi-statically configured, while a beamforming configuration (within on periods) may be dynamically configured. As another example, a beamforming configuration may be semi-static, while on-off periods may be dynamically configured.

As shown in FIG. 6, mmW repeater 140 may receive the configuration for the HF interface of mmW repeater 140 and, as shown by reference number 620, may configure the HF interface of mmW repeater 140 based at least in part on the configuration. In some aspects, mmW repeater 140 may receive the configuration via the LF interface after mmW repeater 140 transmits the information associated with the HF interface via the LF interface.

In some aspects, mmW repeater 140 may communicate via the HF interface based at least in part on configuration. For example, mmW repeater 140 may communicate with base station 110 and/or another wireless node via the HF interface in accordance with the configuration. In some aspects, base station 110 may communication with a wireless node (e.g., another base station, a UE 120, and/or the like) via mmW repeater 140 and using the second interface. For example, base station 110 may provide a communication to mmW repeater 140, and mmW repeater 140 may forward the communication to the other wireless node via the HF interface of mmW repeater 140. As another example, the other wireless node may provide a communication to mmW repeater 140, and mmW repeater 140 may forward the communication to base station 110 via the HF interface of mmW repeater 140.

As indicated above, FIG. 6 is provided as an example. Other examples may differ from what is described with respect to FIG. 6.

Figure 7:
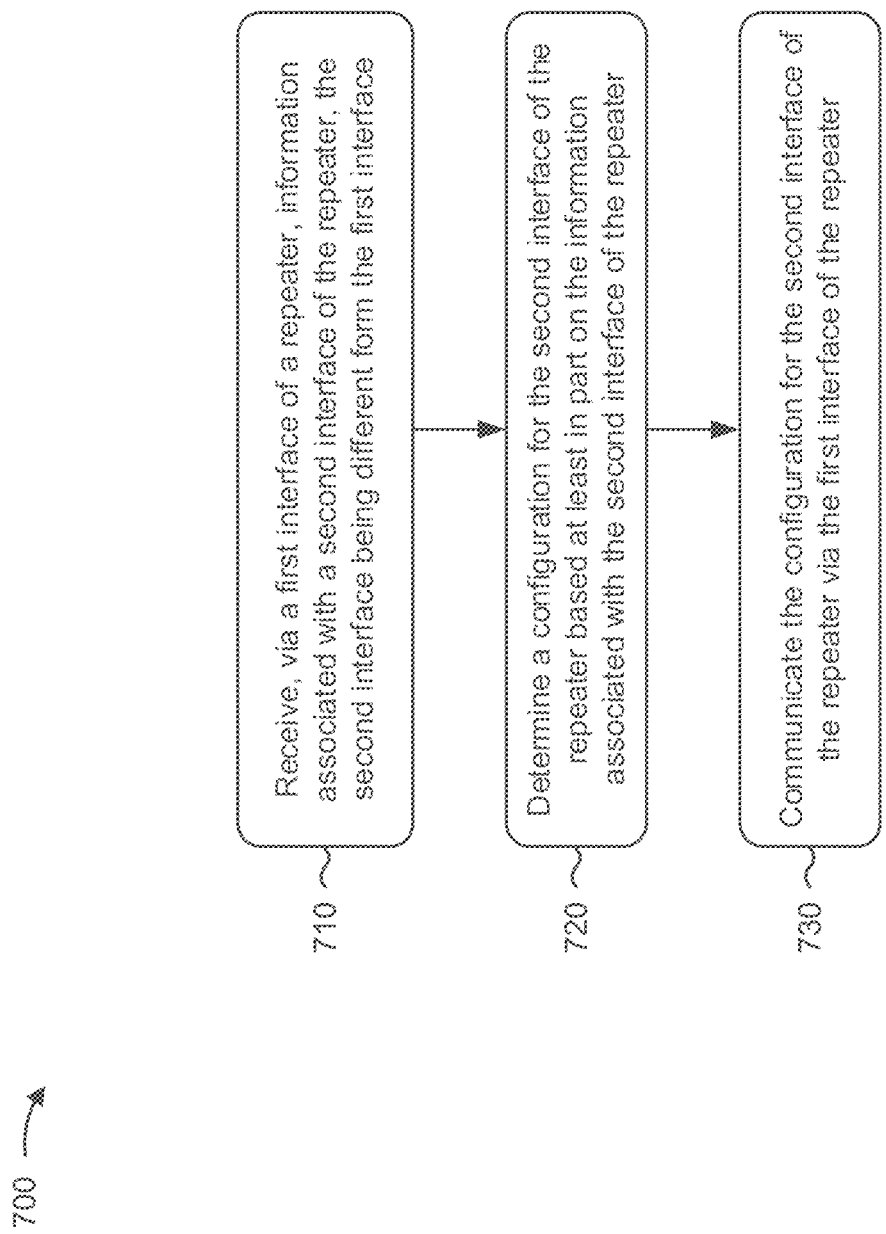
FIGS. 7 and 8 are diagrams illustrating example processes associated with a control plane of a millimeter wave repeater, in accordance with various aspects of the present disclosure.

FIG. 7 is a diagram illustrating an example process 700 performed, for example, by a base station, in accordance with various aspects of the present disclosure. Example process 700 is an example where a base station (e.g., base station 110) performs operations associated with a control plane of a repeater (e.g., mmW repeater 140).

As shown in FIG. 7, in some aspects, process 700 may include receiving, via a first interface of a repeater, information associated with a second interface of the repeater, the second interface being different from the first interface (block 710). For example, the base station (e.g., antenna 234, receive processor 238, controller/processor 240, and/or the like) may receive, via a first interface of a repeater, information associated with a second interface of the repeater, as described above. In some aspects, the second interface may be different from the first interface. For example, the second interface may be an HF interface and the first interface may be an LF interface, in some aspects. In some aspects, the second interface and the first interface may be different interfaces, but may be the same in terms of frequency. For example, the second interface may be an interface used for relaying a signal and the first interface may be a control interface, where the interface used for relaying the signal and the control interface operate in the same frequency band.

As further shown in FIG. 7, in some aspects, process 700 may include determining a configuration for the second interface of the repeater based at least in part on the information associated with the HF interface (block 720). For example, the base station (e.g., using controller/processor 240, memory 242, and/or the like) may determine a configuration for the second interface of the repeater based at least in part on the information associated with the HF interface, as described above.

As further shown in FIG. 7, in some aspects, process 700 may include communicating the configuration for the second interface of the repeater via the first interface of the repeater (block 730). For example, the base station (e.g., using antenna 234, transmit processor 220, controller/processor 240, memory 242, and/or the like) may communicate the configuration for the second interface of the repeater via the first interface of the repeater, as described above.

Process 700 may include additional aspects, such as any single implementation or any combination of aspects described below and/or in connection with one or more other processes described elsewhere herein.

In a first aspect, the first interface is a low frequency interface and the second interface is a millimeter wave interface.

In a second aspect, alone or in combination with the first aspect, the base station may transmit, to the repeater, a request for the information associated with the second interface of the repeater.

In a third aspect, alone or in combination with one or more of the first and second aspects, the base station may establish a connection with the repeater via the first interface.

In a fourth aspect, alone or in combination with one or more of the first through third aspects, the base station may communicate with the repeater via the second interface based at least in part on the configuration.

In a fifth aspect, alone or in combination with one or more of the first through fourth aspects, the base station may communicate with a wireless node via the repeater and using the second interface.

In a sixth aspect, alone or in combination with one or more of the first through fifth aspects, the information associated with the second interface includes information associated with at least one of: a capability associated with the second interface of the repeater, a configuration of the second interface of the repeater, an architecture of the second interface of the repeater, or some combination thereof.

In a seventh aspect, alone or in combination with one or more of the first through sixth aspects, the information associated with the second interface of the repeater includes information that identifies one or more components of the second interface of the repeater and capability information associated with the one or more components of the second interface of the repeater.

In an eighth aspect, alone or in combination with one or more of the first through seventh aspects, the information associated with the second interface of the repeater includes information that describes interconnection of two or more components of the second interface of the repeater.

In a ninth aspect, alone or in combination with one or more of the first through eighth aspects, the information associated with the second interface of the repeater includes information that describes a beamforming configuration associated with the second interface of the repeater.

In a tenth aspect, alone or in combination with one or more of the first through ninth aspects, the configuration includes information associated with at least one of: powering on one or more components of the second interface of the repeater, powering off one or more components of the second interface of the repeater, setting a gain of a power amplifier, a transmit beam beamforming configuration, a receive beam beamforming configuration, measuring receive power on a given antenna of the second interface of the repeater, generating or transmitting a signal using the second interface of the repeater, performing beam sweeping, a set of time-domain resources on which to apply the configuration, or some combination thereof.

In an eleventh aspect, alone or in combination with one or more of the first through tenth aspects, a control command, associated with the configuration, includes a set of control fields including at least one of: a timing configuration field, a beamforming configuration field, a power configuration field, an operating mode field, or some combination thereof.

In a twelfth aspect, alone or in combination with one or more of the first through eleventh aspects, the configuration indicates an active setting associated with the second interface of the repeater.

In a thirteenth aspect, alone or in combination with one or more of the first through twelfth aspects, the configuration indicates a passive setting associated with the second interface of the repeater, the passive setting including one or more sets of configurations capable of being activated at a later time.

In a fourteenth aspect, alone or in combination with one or more of the first through thirteenth aspects, the configuration is used to semi-statically configure a first parameter associated with the second interface and to dynamically configure a second parameter associated with the second interface.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
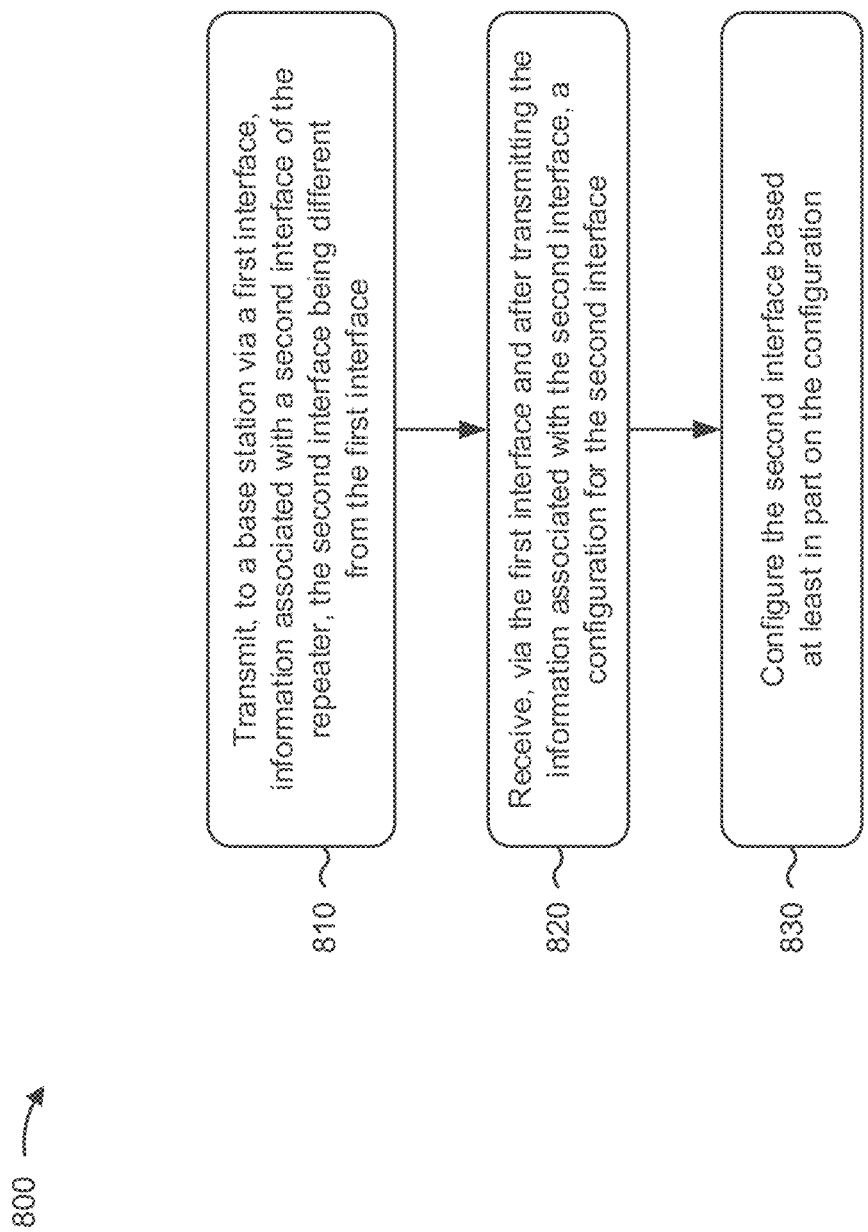

FIG. 8 is a diagram illustrating an example process 800 performed, for example, by a repeater, in accordance with various aspects of the present disclosure. Example process 800 is an example where a repeater (e.g., mmW repeater 140) performs operations associated with a control plane of the repeater.

As shown in FIG. 8, in some aspects, process 800 may include transmitting, to a base station via a first interface, information associated with a second interface, the second interface being different from the first interface (block 810). For example, the repeater (e.g., using controller 530, communication component 540, and/or the like) may transmit, to a base station via a first interface, information associated with the HF interface, as described above. In some aspects, the second interface may be different from the first interface. For example, the second interface may be an HF interface and the first interface may be an LF interface, in some aspects. In some aspects, the second interface and the first interface may be different interfaces, but may be the same in terms of frequency. For example, the second interface may be an interface used for relaying a signal and the first interface may be a control interface, where the interface used for relaying the signal and the control interface operate in the same frequency band.

As further shown in FIG. 8, in some aspects, process 800 may include receiving, via the first interface and after transmitting the information associated with the HF interface, a configuration for the second interface (block 820). For example, the repeater (e.g., controller 530, communication component 540, and/or the like) may receive, via the first interface and after transmitting the information associated with the HF interface, a configuration for the second interface, as described above.

As further shown in FIG. 8, in some aspects, process 800 may include configuring the second interface based at least in part on the configuration (block 830). For example, the repeater (e.g., using controller 530) may configure the second interface based at least in part on the configuration, as described above.

Process 800 may include additional aspects, such as any single implementation or any combination of aspects described below and/or in connection with one or more other processes described elsewhere herein.

In a first aspect, the first interface is a low frequency interface and the second interface is a millimeter wave interface.

In a second aspect, alone or in combination with the first aspect, the repeater may receive, from the base station, a request for the information associated with the second interface.

In a third aspect, alone or in combination with one or more of the first and second aspects, the repeater may establish a connection with the base station via the first interface.

In a fourth aspect, alone or in combination with one or more of the first through third aspects, the repeater may communicate via the second interface based at least in part on the configuration.

In a fifth aspect, alone or in combination with one or more of the first through fourth aspects, the information associated with the second interface includes information associated with at least one of: a capability associated with the second interface, a configuration of the second interface, an architecture of the second interface, or some combination thereof.

In a sixth aspect, alone or in combination with one or more of the first through fifth aspects, the information associated with the second interface includes information that identifies one or more components of the second interface and capability information associated with the one or more components of the second interface.

In a seventh aspect, alone or in combination with one or more of the first through sixth aspects, the information associated with the second interface includes information that describes interconnection of two or more components of the second interface.

In an eighth aspect, alone or in combination with one or more of the first through seventh aspects, the information associated with the second interface includes information that describes a beamforming configuration associated with the second interface.

In a ninth aspect, alone or in combination with one or more of the first through eighth aspects, the configuration includes information associated with at least one of: powering on one or more components of the second interface, powering off one or more components of the second interface, setting a gain of a power amplifier, a transmit beam beamforming configuration, a receive beam beamforming configuration, measuring receive power on a given antenna of the second interface, generating or transmitting a signal using the second interface, performing beam sweeping, a set of time-domain resources on which to apply the configuration, or some combination thereof.

In a tenth aspect, alone or in combination with one or more of the first through ninth aspects, a control command, associated with the configuration, includes a set of control fields including at least one of: a timing configuration field, beamforming configuration field, a power configuration field, an operating mode field, or some combination thereof.

In an eleventh aspect, alone or in combination with one or more of the first through tenth aspects, the configuration indicates an active setting associated with the second interface.

In a twelfth aspect, alone or in combination with one or more of the first through eleventh aspects, the configuration indicates a passive setting associated with the second interface, the passive setting including one or more sets of configurations capable of being activated at a later time.

In a thirteenth aspect, alone or in combination with one or more of the first through twelfth aspects, the configuration is used to semi-statically configure a first parameter associated with the second interface and to dynamically configure a second parameter associated with the second interface.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a network entity, comprising:
    receiving information associated with a component of an analog millimeter wave signal repeater that is configured to amplify an analog millimeter wave signal;
    determining a configuration for the component of the analog millimeter wave signal repeater based at least in part on the information associated with the component of the analog millimeter wave signal repeater,
    wherein the configuration for the component of the analog millimeter wave signal repeater includes information associated with at least a beamforming configuration, and
    wherein a control command, associated with the configuration for the component of the analog millimeter wave signal repeater, includes a set of control fields including:
        a timing configuration field,
        a beamforming configuration field, and
        a power configuration field; and
    communicating the configuration for the component of the analog millimeter wave signal repeater.

2. The method of claim 1, wherein the component of the analog millimeter wave signal repeater is a millimeter wave interface.

3. The method of claim 1, wherein the information associated with the component of the analog millimeter wave signal repeater includes information that describes the beamforming configuration.

4. The method of claim 1, further comprising:
communicating with the analog millimeter wave signal repeater via the component of the analog millimeter wave signal repeater based at least in part on the configuration.

5. The method of claim 1, further comprising:
communicating with a wireless node via the analog millimeter wave signal repeater and using the component of the analog millimeter wave signal repeater.

6. The method of claim 1, wherein the information associated with the component of the analog millimeter wave signal repeater includes information associated with at least one of:
a capability associated with the component of the analog millimeter wave signal repeater,
the configuration of the component of the analog millimeter wave signal repeater,
an architecture of the component of the analog millimeter wave signal repeater, or
some combination thereof.

7. The method of claim 1, wherein the information associated with the component of the analog millimeter wave signal repeater includes information that identifies one or more components of the component of the analog millimeter wave signal repeater and capability information associated with the one or more components of the component of the analog millimeter wave signal repeater.

8. The method of claim 1, wherein the information associated with the component of the analog millimeter wave signal repeater includes information that describes interconnection of two or more components of the component of the analog millimeter wave signal repeater.

9. The method of claim 1, wherein the configuration for the component of the analog millimeter wave signal repeater further includes information associated with at least one of:
powering on one or more components of the component of the analog millimeter wave signal repeater,
powering off one or more components of the component of the analog millimeter wave signal repeater,
a set of time-domain resources on which to apply the configuration, or
some combination thereof.

10. The method of claim 1, wherein the configuration for the component of the analog millimeter wave signal repeater indicates an active setting associated with the component of the analog millimeter wave signal repeater.

11. The method of claim 1, wherein the configuration for the component of the analog millimeter wave signal repeater indicates a passive setting associated with the component of the analog millimeter wave signal repeater, the passive setting including one or more sets of configurations capable of being activated at a later time.

12. The method of claim 1, wherein the configuration for the component of the analog millimeter wave signal repeater is used to semi-statically configure a first parameter associated with the component of the analog millimeter wave signal repeater and to dynamically configure a second parameter associated with the component of the analog millimeter wave signal repeater.

13. A method of wireless communication performed at an analog millimeter wave signal repeater, comprising:
transmitting information associated with a component of the analog millimeter wave signal repeater, wherein the analog millimeter wave signal repeater is configured to amplify an analog millimeter wave signal;
receiving, after transmitting the information associated with the component of the analog millimeter wave signal repeater, a configuration for the component of the analog millimeter wave signal repeater,
wherein the configuration for the component of the analog millimeter wave signal repeater includes information associated with at least a beamforming configuration, and
wherein a control command, associated with the configuration for the component of the analog millimeter wave signal repeater, includes a set of control fields including:
a timing configuration field,
a beamforming configuration field, and
a power configuration field; and
configuring the component of the analog millimeter wave signal repeater based at least in part on the configuration for the component of the analog millimeter wave signal repeater.

14. The method of claim 13, wherein the component of the analog millimeter wave signal repeater is a millimeter wave interface.

15. The method of claim 13, wherein the information associated with the component of the analog millimeter wave signal repeater includes information that describes the beamforming configuration.

16. The method of claim 13, further comprising:
receiving, from a network entity, a request for the information associated with the component of the analog millimeter wave signal repeater.

17. The method of claim 13, further comprising:
communicating, via the component of the analog millimeter wave signal repeater, based at least in part on the configuration for the component of the analog millimeter wave signal repeater.

18. The method of claim 13, wherein the information associated with the component of the analog millimeter wave signal repeater includes information associated with at least one of:
a capability associated with the component of the analog millimeter wave signal repeater,
the configuration of the component of the analog millimeter wave signal repeater,
an architecture of the component of the analog millimeter wave signal repeater, or
some combination thereof.

19. The method of claim 13, wherein the information associated with the component of the analog millimeter wave signal repeater includes information that identifies one or more components of the component of the analog millimeter wave signal repeater and capability information associated with the one or more components of the component of the analog millimeter wave signal repeater.

20. The method of claim 13, wherein the information associated with the component of the analog millimeter wave signal repeater includes information that describes interconnection of two or more components of the component of the analog millimeter wave signal repeater.

21. The method of claim 13, wherein the configuration for the component of the analog millimeter wave signal repeater further includes information associated with at least one of:

powering on one or more components of the component of the analog millimeter wave signal repeater,
powering off one or more components of the component of the analog millimeter wave signal repeater,
a set of time-domain resources on which to apply the configuration for the component of the analog millimeter wave signal repeater, or
some combination thereof.

22. The method of claim 13, wherein the configuration for the component of the analog millimeter wave signal repeater indicates an active setting associated with the component of the analog millimeter wave signal repeater.

23. The method of claim 13, wherein the configuration for the component of the analog millimeter wave signal repeater indicates a passive setting associated with the component of the analog millimeter wave signal repeater,
the passive setting including one or more sets of configurations capable of being activated at a later time.

24. The method of claim 13, wherein the configuration for the component of the analog millimeter wave signal repeater is used to semi-statically configure a first parameter associated with the component of the analog millimeter wave signal repeater and to dynamically configure a second parameter associated with the component of the analog millimeter wave signal repeater.

25. An apparatus for wireless communication at a network entity, comprising:
a memory; and
one or more processors, coupled to the memory, configured to cause the network entity to:
receive information associated with a component of an analog millimeter wave signal repeater configured to amplify an analog millimeter wave signal;
determine a configuration for the component of the analog millimeter wave signal repeater based at least in part on the information associated with the component of the analog millimeter wave signal repeater,
wherein the configuration for the component of the analog millimeter wave signal repeater includes information associated with at least a beamforming configuration, and
wherein a control command, associated with the configuration for the component of the analog millimeter wave signal repeater, includes a set of control fields that includes:
a timing configuration field,
a beamforming configuration field, and
a power configuration field; and
communicate the configuration for the component of the analog millimeter wave signal repeater.

26. An analog millimeter wave signal repeater, comprising: a memory; and
one or more processors, coupled to the memory, configured to cause the analog millimeter wave signal repeater to:
transmit information associated with a component of the analog millimeter wave signal repeater, wherein the analog millimeter wave signal repeater is configured to amplify an analog millimeter wave signal;
receive, after the information associated with the component of the analog millimeter wave signal repeater is transmitted, a configuration for the component of the analog millimeter wave signal repeater,
wherein the configuration for the component of the analog millimeter wave signal repeater includes information associated with at least a beamforming configuration, and wherein a control command, associated with the configuration for the component of the analog millimeter wave signal repeater, includes a set of control fields including:
a timing configuration field,
a beamforming configuration field, and
a power configuration field; and
configure the component of the analog millimeter wave signal repeater based at least in part on the configuration for the component of the analog millimeter wave signal repeater.

27. The apparatus of claim 25,
wherein the analog millimeter wave signal repeater further includes a different component that is configured to enable communications via a low frequency interface.

28. The apparatus of claim 25, wherein the information associated with the component of the analog millimeter wave signal repeater includes information that describes the beamforming configuration.

29. The analog millimeter wave signal repeater of claim 26, further comprising:
the component of the analog millimeter wave signal repeater, and
a different component that is configured to enable communications via a low frequency interface.

30. The analog millimeter wave signal repeater of claim 26, wherein the information associated with the component of the analog millimeter wave signal repeater includes information that describes the beamforming configuration.

31. A non-transitory computer-readable medium storing a set of instructions for wireless communication, the set of instructions comprising:
one or more instructions that, when executed by one or more processors of a network entity, cause the network entity to:
receive information associated with a component of an analog millimeter wave signal repeater that is configured to amplify an analog millimeter wave signal;
determine a configuration for the component of the analog millimeter wave signal repeater based at least in part on the information associated with the component of the analog millimeter wave signal repeater,
wherein the configuration for the component of the analog millimeter wave signal repeater includes information associated with at least a beamforming configuration, and
wherein a control command, associated with the configuration for the component of the analog millimeter wave signal repeater, includes a set of control fields including:
timing configuration field,
a beamforming configuration field, and
a power configuration field; and
communicate the configuration for the component of the analog millimeter wave signal repeater.

32. The non-transitory computer-readable medium of claim 31,
wherein the analog millimeter wave signal repeater further includes a different component that is configured to enable communications via a low frequency interface.

33. The non-transitory computer-readable medium of claim 31, wherein the information associated with the component of the analog millimeter wave signal repeater includes information that describes the beamforming configuration.

34. A non-transitory computer-readable medium storing a set of instructions for wireless communication, the set of instructions comprising:

one or more instructions that, when executed by one or more processors of an analog millimeter wave signal repeater that is configured to amplify an analog millimeter wave signal, cause the analog millimeter wave signal repeater to:
transmit information associated with a component of the analog millimeter wave signal repeater;
receive, after the information associated with the component of the analog millimeter wave signal repeater is transmitted, a configuration for the component of the analog millimeter wave signal repeater,
wherein the configuration for the component of the analog millimeter wave signal repeater includes information associated with at least a beamforming configuration, and
wherein a control command, associated with the configuration for the component of the analog millimeter wave signal repeater, includes a set of control fields including:
a timing configuration field,
a beamforming configuration field, and
a power configuration field; and
configure the component of the analog millimeter wave signal repeater based at least in part on the configuration for the component of the analog millimeter wave signal repeater.

35. The non-transitory computer-readable medium of claim 34, wherein the component of the analog millimeter wave signal repeater is a millimeter wave interface.

36. The non-transitory computer-readable medium of claim 34, wherein the information associated with the component of the analog millimeter wave signal repeater includes information that describes the beamforming configuration.

37. An apparatus for wireless communication at a network entity, comprising:
a memory; and
one or more processors, coupled to the memory, configured to cause the network entity to:
receive information associated with a component of a millimeter wave signal repeater;
determine a configuration for the component of the millimeter wave signal repeater based at least in part on the information associated with the component of the millimeter wave signal repeater,
wherein the configuration for the component of the millimeter wave signal repeater includes information associated with at least a beamforming configuration, and
wherein a control command, associated with the configuration for the component of the millimeter wave signal repeater, includes a set of control fields that includes:
a timing configuration field,
a beamforming configuration field, and
a power configuration field; and
communicate the configuration for the component of the millimeter wave signal repeater.

38. The apparatus of claim 37, further comprising:
a communication unit coupled to the one or more processors.

39. The apparatus of claim 37, wherein, to receive the information associated with the component of the millimeter wave signal repeater, the one or more processors are configured to cause the network entity to:
receive, from a different component of the millimeter wave signal repeater, information associated with the component of the millimeter wave signal repeater.

40. The apparatus of claim 37, wherein the information associated with the component of the millimeter wave signal repeater comprises information associated with a number of beams.

41. The apparatus of claim 37, wherein the information associated with the component of the millimeter wave signal repeater comprises spatial information.

42. The apparatus of claim 37, wherein the configuration for the component of the millimeter wave signal repeater further includes information associated with powering on or off one or more components of the millimeter wave signal repeater.

43. The apparatus of claim 37, wherein the configuration for the component of the millimeter wave signal repeater further includes information associated with one or more time-domain resources.

44. The apparatus of claim 37, wherein the configuration for the component of the millimeter wave signal repeater is used to semi-statically configure a first parameter associated with the component of the millimeter wave signal repeater and to dynamically configure a second parameter associated with the component of the millimeter wave signal repeater.

45. A millimeter wave signal repeater for wireless communication, comprising:
a memory; and
one or more processors, coupled to the memory, configured to cause the millimeter wave signal repeater to:
transmit information associated with a component of the millimeter wave signal repeater;
receive, after transmitting the information associated with the component of the millimeter wave signal repeater, a configuration for the component of the millimeter wave signal repeater,
wherein the configuration for the component of the millimeter wave signal repeater includes information associated with at least a beamforming configuration, and
wherein a control command, associated with the configuration for the component of the millimeter wave signal repeater, includes a set of control fields that includes:
a timing configuration field,
a beamforming configuration field, and
a power configuration field; and
configure the component of the millimeter wave signal repeater based at least in part on the configuration for the component of the millimeter wave signal repeater.

46. The millimeter wave signal repeater of claim 45, further comprising:
an antenna associated with the component of the millimeter wave signal repeater.

47. The millimeter wave signal repeater of claim 45, wherein the one or more processors are further configured to cause the millimeter wave signal repeater to:
receive a signal from a network entity;
amplify the signal to obtain an amplified signal; and
transmit the amplified signal to one or more user equipments (UEs).

48. The millimeter wave signal repeater of claim 45, wherein the information associated with the component of the millimeter wave signal repeater comprises information associated with a number of beams.

49. The millimeter wave signal repeater of claim 45, wherein the information associated with the component of the millimeter wave signal repeater comprises spatial information.

50. The millimeter wave signal repeater of claim 45, wherein the configuration for the component of the millimeter wave signal repeater further includes information associated with powering on or off one or more components of the millimeter wave signal repeater.

51. The millimeter wave signal repeater of claim 45, wherein the configuration for the component of the millimeter wave signal repeater further includes information associated with one or more time-domain resources.

52. The millimeter wave signal repeater of claim 45, wherein the configuration for the component of the millimeter wave signal repeater is used to semi-statically configure a first parameter associated with the component of the millimeter wave signal repeater and to dynamically configure a second parameter associated with the component of the millimeter wave signal repeater.

53. The apparatus of claim 37, wherein the beamforming configuration is for a transmit (TX) beam or a receive (RX) beam.

54. The millimeter wave signal repeater of claim 45, wherein the beamforming configuration is for a transmit (TX) beam or a receive (RX) beam.

55. The apparatus of claim 25, wherein the analog millimeter wave signal repeater is further configured to use beamforming to communicate via a backhaul beam with the network entity or via an access beam with a UE.

56. The apparatus of claim 37, wherein the millimeter wave signal repeater is further configured to use beamforming to communicate via a backhaul beam with the network entity or via an access beam with a UE.

* * * * *